C. L. FRIEL.
MAKE-UP GAGE.
APPLICATION FILED MAY 18, 1916.
1,232,675.
Patented July 10, 1917.
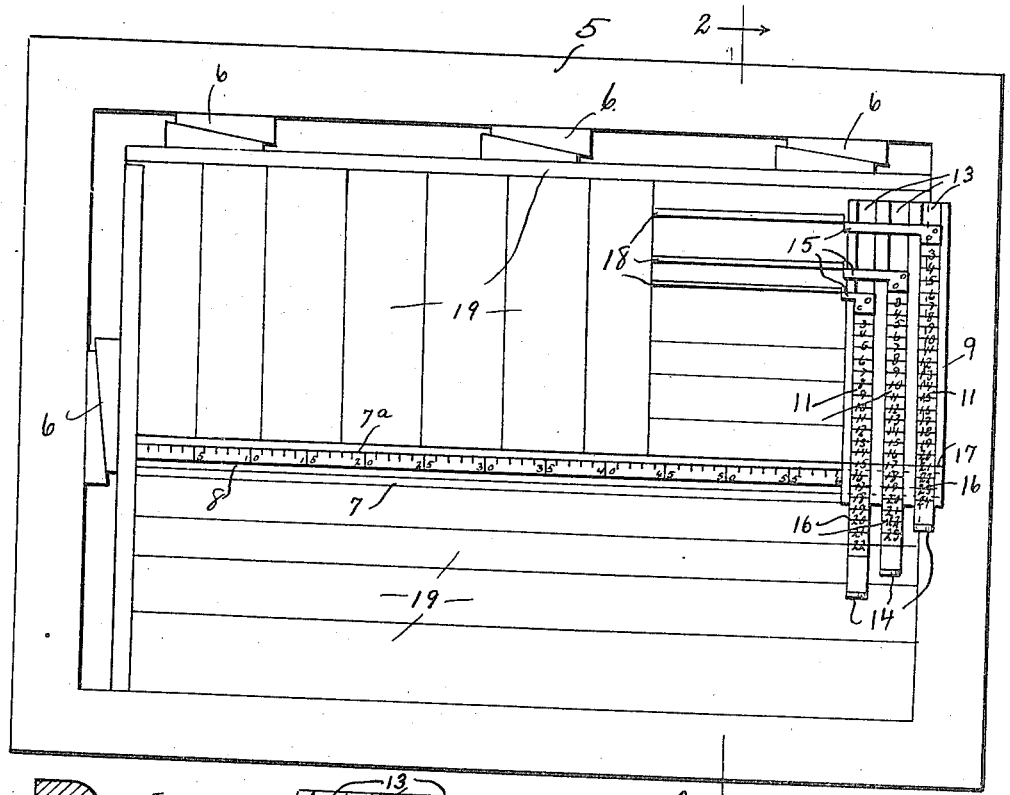
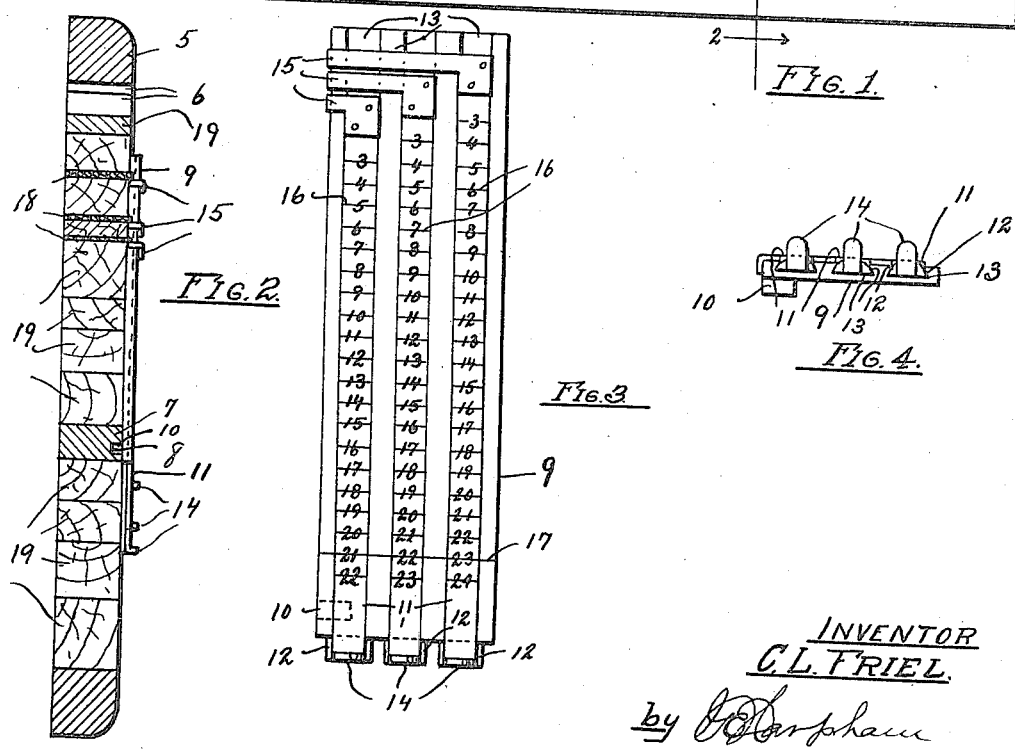
INVENTOR
C. L. FRIEL.
by O. O. Larpham
ATTORNEY

UNITED STATES PATENT OFFICE.

CLAUDE L. FRIEL, OF LOS ANGELES, CALIFORNIA.

MAKE-UP GAGE.

1,232,675.     Specification of Letters Patent.     Patented July 10, 1917.

Application filed May 18, 1916. Serial No. 98,276.

*To all whom it may concern:*

Be it known that I, CLAUDE L. FRIEL, a citizen of the United States, residing at the city of Los Angeles, in the county of Los Angeles and State of California, have invented new and useful Improvements in Make-Up Gages, of which the following is a specification.

My invention relates to a gage by the use of which the position of the type line in the form, or words and characters in the type line can be quickly and accurately located and the object thereof is to produce a simple and inexpensive gage to accomplish these ends.

In the drawings forming part of this application:

Figure 1 is a plan of a form with my gage positioned thereon.

Fig. 2 is a section on the line 2—2 of Fig. 1.

Fig. 3 is an enlarged plan of that portion of the gage for locating the position of the type lines.

Fig. 4 is an end view of Fig. 3, at the inner end.

Referring to the drawings 5 is the chase, in which is locked in the usual manner by quoins 6 the longitudinal gage bar 7. A guide channel 8 is provided in its upper face and along said channel is an index or em scale 7ª showing the number of ems that can be placed in the form longitudinally. This bar is first positioned in the form to occupy a position at the bottom of the work to be printed. A gage plate 9 has a depending lug 10 at its inner end on its lower surface, which lug has a working fit in guide channel 8 of gage bar 7. Plate 9' is provided in its upper face with one or more gage bars 11 which have dovetail edges 12 that slide in dove-tail grooves 13 in plate 9. In the drawings I have shown plate 9 provided with three of these bars but I do not limit myself to any specific number of these bars. Each of these bars has an upwardly projecting lug 14 at its inner end and an indicator arm 15 at its outer end and on its upper surface is provided with an em scale 16. As shown in the drawings the indicator arms all terminate at the left hand edge of plate 9 and for that reason the successive bars from the right hand edge toward the left are made shorter to permit the indicator arm of the bar to the right to pass along the face of plate 9. Plate 9 has a starting or base line 17 from which the position of the type line in the form is fixed as hereafter explained. By inner end of plate 9 is meant the end that lies and slides upon gage bar 7. The outer end of plate 9 is the end opposed to the inner end. The left hand edge of plate 9 is the edge nearer to the point of beginning of em scale 7ª than the other or right hand edge of the plate. By transverse is meant the direction across the part referred to or the distance from side to side. By longitudinal is meant the distance from end to end of the part referred to.

In the use of my improved gage I first lock in the form the longitudinal gage bar at the upper edge of the form to be printed. Say it is desired to locate three short lines of type 18 at 15, 17 and 21 ems respectively from the top of the form. I first slide the right hand gage bar 11 to bring 21 thereof in line with base line 17 of plate 9. I then slide the next bar 11 to bring 17 thereon into line with base line 17. I then slide the next bar 11 to bring 15 thereon in line with the base line 17 and the top edges of the indicator arms carried by these bars indicate the correct positions in the form for these type lines, which are then secured in the form by furniture 19 which is locked in place by quoins 6 in the usual manner. Should partial lines be required in different positions in the page I would find the em positions from the top as before explained and by moving the gage plate 9 with the left hand edge in register with the desired em position on the longitudinal bar for the right hand end of such partial line, when such partial line can be correctly positioned and locked in the form in the usual manner. Lug 10 fits snugly in channel 8 so as to keep the gage plate at right angles to the gage bar.

By means of this gage it will be seen that partial lines or characters can be quickly and accurately positioned on partly printed work, such as bank checks or like matter. The guide channel for the gage plate could be positioned in the chase and the longitudinal gage bar omitted. In such case the chase would provide means for guiding and holding the measuring plate.

Having described my invention what I claim is:

1. A makeup gage comprising a longitudinal bar having a guide channel in its upper surface; a gage plate having a depending lug and one or more grooves in its upper surface, said lug having a working sliding fit in the channel of the longitudinal bar and a measuring bar slidably mounted in each of said grooves, said longitudinal bar being adapted to be secured in a form, and to extend longitudinally of the same.

2. A makeup gage comprising a gage plate having one or more grooves in its upper surface; a gage in each of said grooves; and means to hold and guide said plate in a form.

3. A makeup gage comprising a longitudinal bar having a guide channel in its upper surface and an em index adjacent to said channel; a gage plate having one or more grooves and a base line in its upper surface and a depending lug secured thereto; a gage bar mounted in each of said grooves, each bar having on its upper surface an em index; indicator arms secured to the upper ends of said bars; and lugs secured to the lower ends of said bars.

In witness that I claim the foregoing I have hereunto subscribed my name this 3rd, day of May, 1916.

CLAUDE L. FRIEL.

Copies of this patent may be obtained for five cents each, by addressing the "Commissioner of Patents, Washington, D. C."